(12) United States Patent
Soumi et al.

(10) Patent No.: US 6,950,142 B2
(45) Date of Patent: Sep. 27, 2005

(54) CRADLE FOR DIGITAL CAMERA

(75) Inventors: Mitsuo Soumi, Saitama-ken (JP); Shino Kanamori, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 522 days.

(21) Appl. No.: 10/023,426

(22) Filed: Dec. 20, 2001

(65) Prior Publication Data

US 2002/0079864 A1 Jun. 27, 2002

(30) Foreign Application Priority Data

Dec. 21, 2000 (JP) ........................................ 2000-388437
Dec. 21, 2000 (JP) ........................................ 2000-388438
Oct. 15, 2001 (JP) ........................................ 2001-316256

(51) Int. Cl.[7] ............................................ H04N 5/225
(52) U.S. Cl. .................. 348/375; 348/207.1; 348/207.2
(58) Field of Search .............................. 348/375, 207.1, 348/207.2, 207.11; D16/214, 215, 235; 320/114

(56) References Cited

U.S. PATENT DOCUMENTS 4,937,676 A * 6/1990 Finelli et al. ............... 348/375
6,138,826 A * 10/2000 Kanamori et al. ......... 206/316.2
6,717,762 B1 * 4/2004 Bauck et al. .................. 360/75
2002/0071035 A1 * 6/2002 Sobol ........................ 348/207
2003/0071915 A1 * 4/2003 Kanamori .................. 348/375

FOREIGN PATENT DOCUMENTS

| EP | 0 624 038 A1 | 11/1994 |
| JP | 11-220691 A | 8/1999 |
| JP | 2000-152047 A | 5/2000 |

* cited by examiner

Primary Examiner—Wendy R. Garber
Assistant Examiner—Nelson D. Hernandez
(74) Attorney, Agent, or Firm—Sughrue Mion, PLLC

(57) ABSTRACT

A cradle for a digital camera. When a digital camera is set in a retainer of the cradle, side portions of a wall formed at the retainer are disposed to shield a charging terminal and a USB terminal formed at a lower portion of a side surface of a casing of the digital camera. Thus, a charging cord and a USB cord cannot be connected directly to the charging terminal and the USB terminal when the digital camera has been set in the digital camera cradle. That is, when the digital camera is set in the cradle, it is possible to prevent redundant connection of connecting cords to any ones of a plurality of connecting terminals formed in the digital camera that are of kinds the same as other connecting terminals of the digital camera, which others are connected to connecting terminals provided at the cradle.

18 Claims, 9 Drawing Sheets

CRADLE FOR DIGITAL CAMERA

BACKGROUND OF THE INVENTION

1. Field of the Invention

The present invention relates to a cradle for retaining therein a digital camera provided with a plurality of connecting terminals.

2. Description of the Related Art

As shown in FIG. 8, there has been conventionally a digital camera 200 provided with a plurality of connecting terminals such as a charging (power source) terminal 204 and a USB terminal 206 serving as an external device connecting terminal at the lower portion of a side surface 202A of a casing 202.

However, in the above-described configuration, as shown in FIG. 8, the charging terminal 204 and the USB terminal 206 formed in the digital camera 200 may be exposed to the outside in the state in which the digital camera 200 is set in a digital camera cradle 210. In the digital camera cradle 210, a charging terminal connector and a USB terminal connector, neither shown, are generally formed at a retaining surface 210A for retaining the digital camera 200 therein. The charging terminal connector and the USB terminal connector are designed to be connected to a charging terminal 212 and a USB terminal 214, respectively, which are formed at a lower surface 202B of the casing 202 of the digital camera 200.

As a result, with the above-described configuration, the digital camera 200 is set in the digital camera cradle 210, and thus both of a charging cord 216 and a USB cord 218 are connected to the digital camera 200 via the digital camera cradle 210. However, another charging cord or a USB cord serving as a personal computer connecting cord may be accidentally connected redundantly to the charging terminal 204 or the USB terminal 206, respectively.

SUMMARY OF THE INVENTION

The present invention has been accomplished in view of the above-described situation. Accordingly, an object of the present invention is to provide a cradle for a digital camera that is capable, when a digital camera is set in the cradle, of preventing redundant connection of connecting cords to those of a plurality of connecting terminals formed in the digital camera that are of kinds that are also connected to connecting terminals provided at the cradle.

In order to achieve the above-described object, a cradle for a digital camera according to a first aspect of the present invention includes: a retainer for retaining therein a digital camera provided with connecting terminals of a first plurality of kinds; a shield formed at the retainer; and a composite terminal including integratedly formed connecting terminals of a second plurality of kinds, wherein, when the digital camera is set in the cradle, the shield shields, of the connecting terminals of the first plurality of kinds, connecting terminals that are the same kinds as the connecting terminals of the second plurality of kinds.

Consequently, when the digital camera is set in the retainer in the digital camera cradle, since the shield formed at the retainer shields those of the plurality of connecting terminals formed in the digital camera that are of kinds that are also connected to the connecting terminals provided at the cradle, connecting cords cannot be connected directly to such connecting terminals. As a result, it is possible to prevent redundant connection of connecting cords when the digital camera is set in the digital camera cradle.

According to a second aspect of the present invention, in the digital camera cradle according to the first aspect of the present invention, the connecting terminals shielded by the shield are a charging terminal and/or an external device connecting terminal.

Consequently, further according to the first aspect of the present invention, it is possible to prevent redundant connection of a charging cord and/or external device connecting cord to the charging terminal and/or external device connecting terminal of the digital camera.

According to a third aspect of the present invention, the external device connecting terminal in the digital camera cradle according to the second aspect of the present invention is a personal computer connecting terminal.

Consequently, further according to the second aspect of the present invention, it is possible to prevent redundant connection of a personal computer connecting cord to the personal computer connecting terminal of the digital camera.

According to a fourth aspect of the present invention, a predetermined position of the shield is aligned with a set-state comfirmation means formed at the side of the digital camera in the state in which the digital camera is completely set in the retainer, in the digital camera cradle according to any one of the first to third aspects of the present invention.

Consequently, further according to the first to third aspects of the present invention, since a predetermined position of the shield is aligned with the set-state comfirmation means formed on the side of the digital camera when the digital camera is set in the retainer in the digital camera cradle, it is possible to confirm that the digital camera is completely set in the retainer. As a result, it is possible to prevent a setting deficiency of the digital camera in the digital camera cradle.

DETAILED DESCRIPTION OF THE PREFERRED EMBODIMENTS

A digital camera cradle according to a first embodiment of the present invention will be described hereinafter with reference to FIGS. 1 to 5 and 9.

Figure 2:
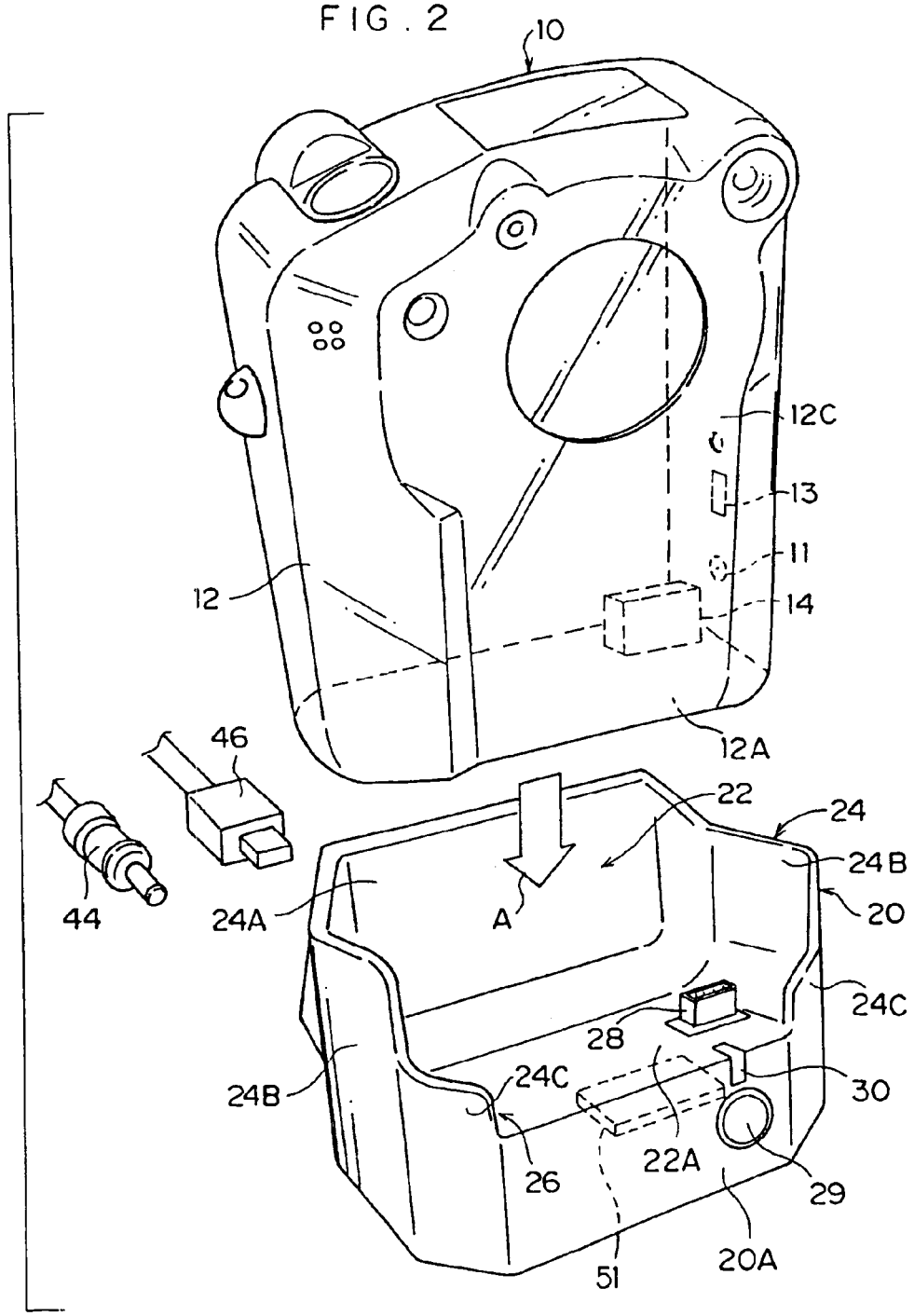
FIG. 2 is a perspective view illustrating a state in which the digital camera has not yet been set in the digital camera cradle according to the first embodiment of the present invention.

As shown in FIG. 2, a composite terminal 14 configured by integrating with each other a charging terminal and a USB terminal that serves as a personal computer connecting terminal is formed at a lower surface 12A of a casing 12 of a digital camera 10. The digital camera 10 can be inserted from above down into a retainer 22 in a digital camera cradle 20 (in a direction indicated by an arrow A in FIG. 2).

Figure 1:
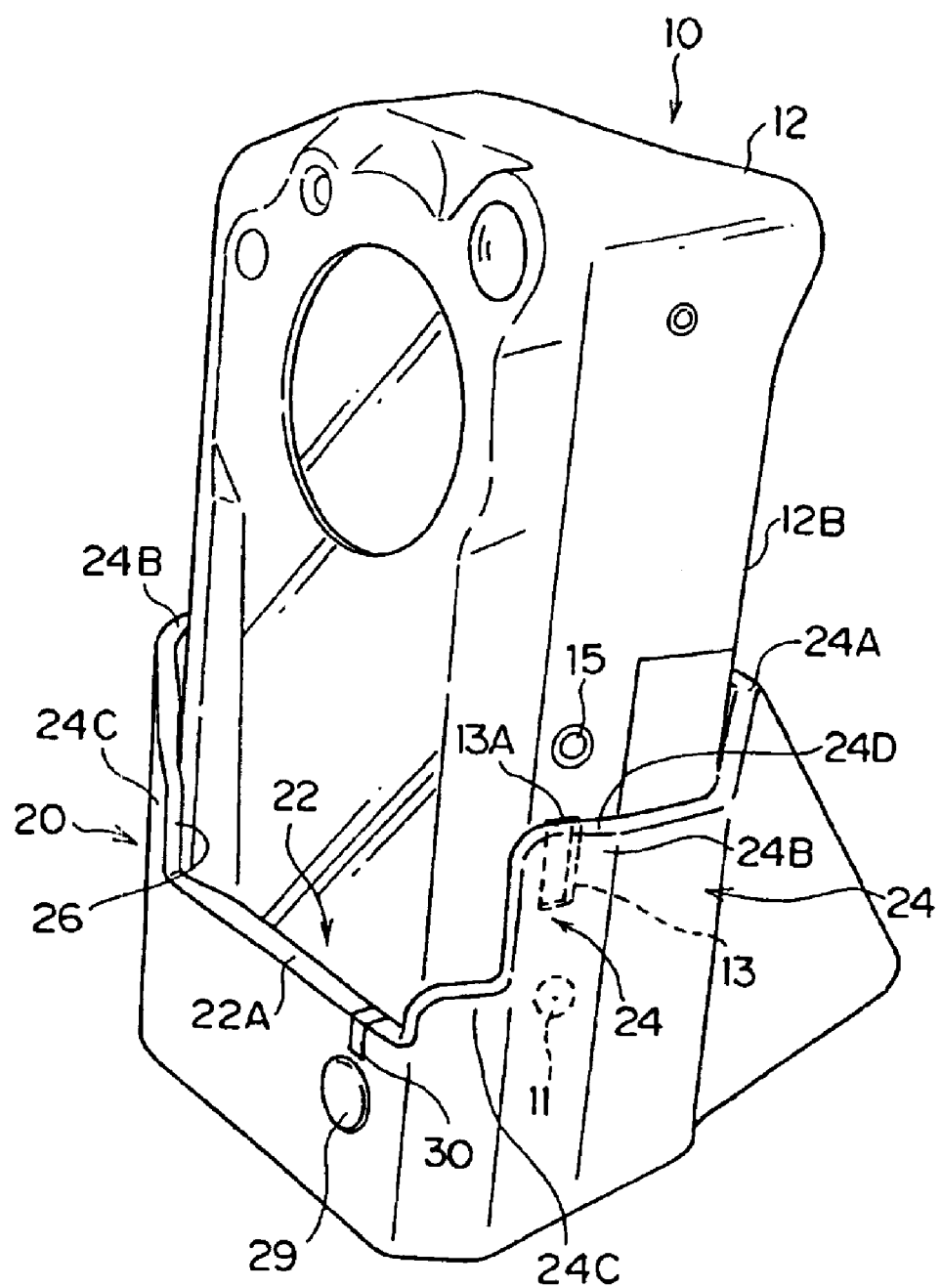
FIG. 1 is a perspective view illustrating a state in which a digital camera is set in a digital camera cradle according to a first embodiment of the present invention.

As shown in FIG. 1, a charging terminal 11 and a USB terminal 13, which serves as a personal computer connecting terminal or an external device connecting terminal, are formed at a lower portion of a side surface 12B of the casing 12 of the digital camera 10. The charging terminal 11 and the USB terminal 13 are used when the digital camera 10 is not set in the digital camera cradle 20. Furthermore, an AV (audio/video) terminal 15 is formed above the USB terminal 13 in the casing 12 of the digital camera 10.

As shown in FIG. 2, the retainer 22 for setting the digital camera 10 therein is formed at the upper portion of the digital camera cradle 20. At an outer peripheral portion of the retainer 22 a wall 24 is formed upward. The height of the wall 24 is gradually reduced from a highest rear portion 24A to front portions 24C via side portions 24B, which serve as a shield. The front portions 24C are divided into right and left portions by a cutout 26 formed at a width direction central portion. The inner circumferential shape of the wall 24 in the retainer 22 substantially conforms with the outer peripheral shape of a lower portion of the casing 12 of the digital camera 10. In the state in which the digital camera 10 is inserted into the retainer 22 in the digital camera cradle 20, the lower surface 12A of the casing 12 of the digital camera 10 continuously abuts against a predetermined position of a bottom 22A of the retainer 22.

At the bottom 22A of the retainer 22 in the digital camera cradle 20 is formed a composite terminal connector 28, which is configured by integrating a charging terminal connector and a USB terminal connector with each other. The composite terminal connector 28 is formed at such a position as to connect to the composite terminal 14 of the digital camera 10 in the state in which the digital camera 10 is inserted into the retainer 22 of the digital camera cradle 20. Consequently, when the digital camera 10 is inserted into the retainer 22 of the digital camera cradle 20, the composite terminal connector 28 of the digital camera cradle 20 can be automatically connected to the composite terminal 14 of the digital camera 10.

Moreover, in the state in which the composite terminal connector 28 of the digital camera cradle 20 is securely connected to the composite terminal 14 of the digital camera 10, that is, when the digital camera 10 is completely set in the retainer 22 of the digital camera cradle 20, the side portions 24B of the wall 24 can shield both the charging terminal 11 and the USB terminal 13 formed at the lower portion of the side surface 12B of the casing 12 of the digital camera 10 and, further, an upper end 13A of the USB terminal 13, which serves as a set-state comfirmation means, and an upper surface 24D of the side portion 24B are designed to align with each other, as shown in FIG. 1.

As shown in FIG. 2, at a front surface 20A of the digital camera cradle 20 is disposed a main switch 29, of a pushbutton type. Depressing the main switch 29 can turn on or off a power source for the digital camera cradle 20. Additionally, a display 30 consisting of an LED is disposed above the main switch 29 at the front surface 20A of the digital camera cradle 20 and, further, an upper portion of the display 30 is exposed at the bottom 22A of the retainer 22.

Figure 3:
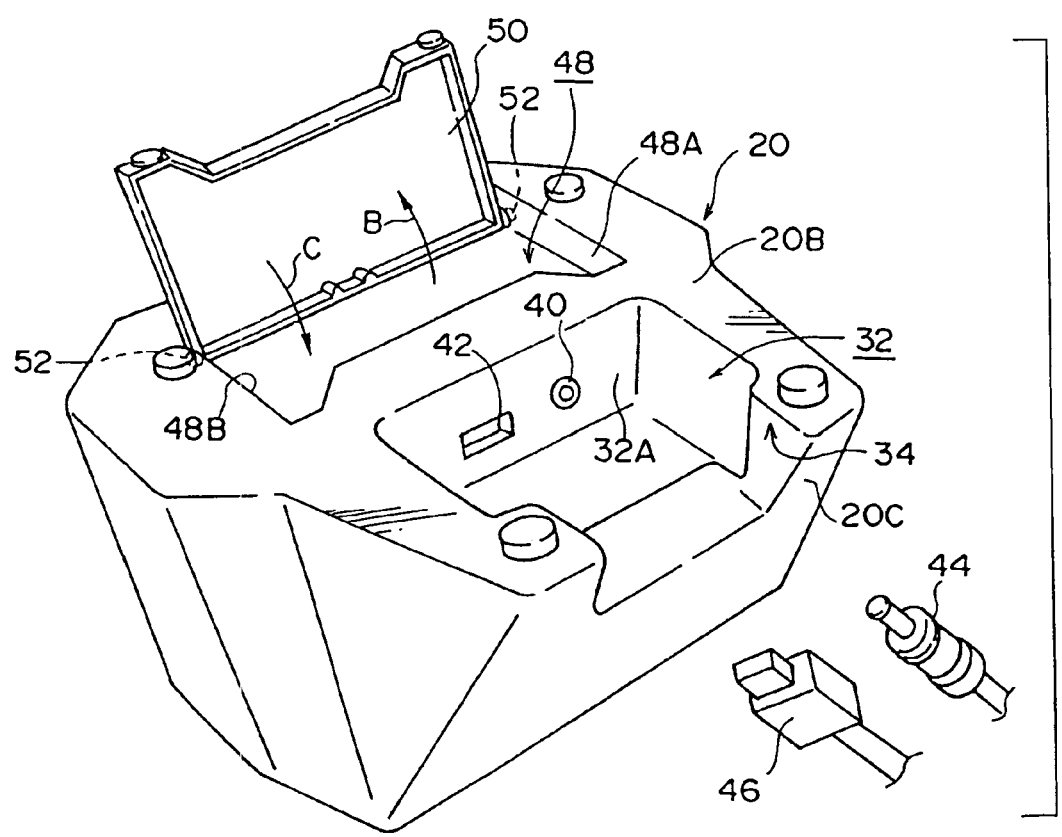
FIG. 3 is a perspective view showing a lower surface of the digital camera cradle according to the first embodiment of the present invention.
Figure 4:
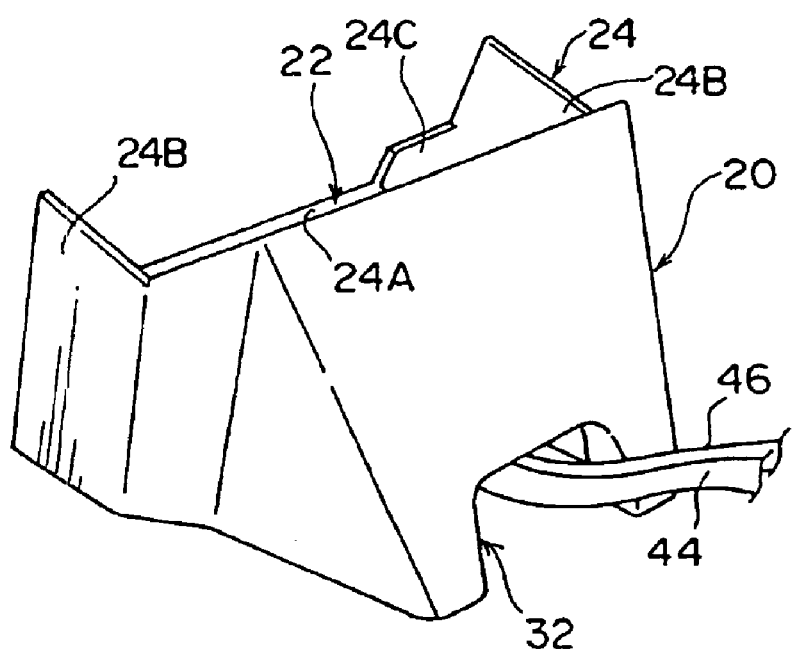
FIG. 4 is a perspective view showing a rear surface of the digital camera cradle according to the first embodiment of the present invention.

As shown in FIG. 3, a deep cavity 32 is formed at a rear portion of a lower surface 20B of the digital camera cradle 20 and, further, a cutout 34 continuous with the cavity 32 is formed at a lower portion of a rear surface 20C of the digital camera cradle 20. Moreover, a charging terminal 40 and a USB terminal 42 are formed on a vertical wall 32A of the cavity 32 opposite to the cutout 34. Accordingly, a charging cord 44 is connected to the charging terminal 40, and a USB cord 46 is connected to the USB terminal 42, such that the charging cord 44 and the USB cord 46 are made to pass through the cutout 34, as shown in FIG. 4.

Figure 5:
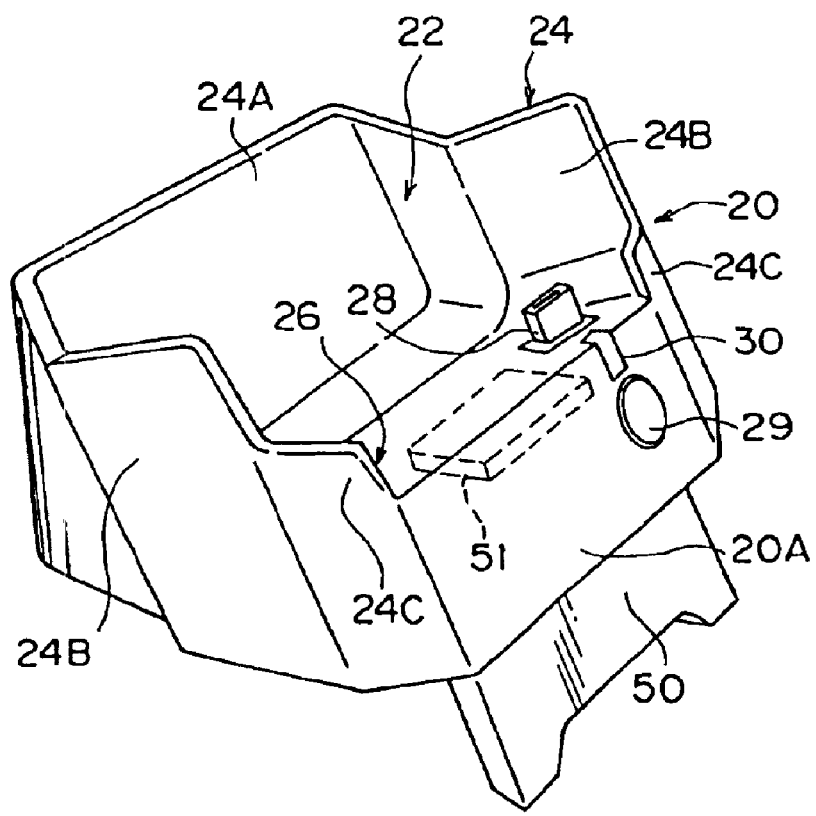
FIG. 5 is a perspective view illustrating a state in which a leg of the digital camera cradle according to the first embodiment of the present invention is used.

Also, a shallow cavity 48 is formed at a front portion of the lower surface 20B of the digital camera cradle 20, and a foldable leg 50 can be contained in the cavity 48. The leg 50 is pivotally supported via pins 52 at front portions of right and left side walls 48A and 48B of the cavity 48, and can therefore be pivoted in directions H indicated by arrows B and C in FIG. 3. Consequently, when the leg 50 is pivoted in the direction indicated by the arrow C from a usage position shown in FIG. 3, the leg 50 is moved to a contained position; in contrast, when the leg 50 is pivoted in the direction indicated by the arrow B from the contained position, the leg 50 is moved to the usage position. When the leg 50 is located at the usage position, as shown in FIG. 5, the front surface 20A of the digital camera cradle 20 can be oriented more upwardly than when the leg 50 is located at the contained position (see FIG. 2).

As shown in FIG. 2, the digital camera cradle 20 includes therein a control circuit 51 provided with a microcomputer. The control circuit 51 is designed to automatically start communications via the USB terminal as soon as it detects an energized state between the composite terminal connector 28 and the composite terminal 14 after the digital camera 10 is set in the retainer 22 in the digital camera cradle 20.

Furthermore, the control circuit 51 is designed to automatically turn on the power source for the digital camera 10 when it detects the energized state between the composite terminal connector 28 and the composite terminal 14 after the digital camera 10 is set in the retainer 22 in the digital camera cradle 20, and to automatically turn off the power source for the digital camera 10 after a predetermined period of time has passed.

Moreover, the control circuit 51 is designed to automatically turn on the power source for the digital camera cradle 20 when it detects the energized state between the composite terminal connector 28 and the composite terminal 14 after the digital camera 10 is set in the retainer 22 in the digital camera cradle 20, and to automatically turn off the power source for the digital camera cradle 20 after a predetermined period of time has passed.

Additionally, the control circuit 51 is designed to light the display 30, for example, yellow during communications via the USB terminal, and to light the display 30, for example, red during charging by the charging terminal.

Next, explanation will be given of operation of the present embodiment.

In the present embodiment, when the digital camera 10 is set in the retainer 22 of the digital camera cradle 20, the composite terminal 14 of the digital camera 10, which is configured by integrating the charging terminal and the USB terminal with each other, can be automatically connected to the composite terminal connector 28 formed in the retainer 22 of the digital camera cradle 20, which is configured by integrating the charging terminal connector and the USB terminal connector with each other.

At this time, since the side portions 24B of the wall 24 formed at the retainer 22 can shield the charging terminal 11 and the USB terminal 13 formed at the lower portion of the side surface 12B of the casing 12 of the digital camera 10 in the present embodiment, the charging cord 44 and the USB cord 46 cannot be connected directly to the charging terminal 11 and the USB terminal 13 of the digital camera 10 when the digital camera 10 is set in the digital camera cradle 20. As a consequence, it is possible to prevent any redundant connection of the charging cord 44 and/or the USB cord 46 when the digital camera 10 is set in the digital camera cradle 20.

Furthermore, since the upper end 13A of the USB terminal 13, which serves as the set-state comfirmation means, and the upper surface 24D of the side portion 24B of the wall 24 are aligned with each other when the digital camera 10 is set in the retainer 22 in the digital camera cradle 20 of the present embodiment, it can be confirmed that the digital camera 10 has been completely set in the retainer 22 in the digital camera cradle 20. Consequently, it is possible to prevent any setting deficiency of the digital camera 10 in the digital camera cradle 20.

Moreover, when the control circuit 51 detects the energized state between the composite terminal connector 28 and the composite terminal 14 after the digital camera 10 is set in the retainer 22 in the digital camera cradle 20 of the present embodiment, communications via the USB terminal can be automatically started, thereby enhancing operability.

Additionally, when the control circuit 51 detects the energized state between the composite terminal connector 28 and the composite terminal 14 after the digital camera 10 is set in the retainer 22 in the digital camera cradle 20 of the present embodiment, the control circuit 51 automatically turns on the power source for the digital camera 10, and, after a predetermined period of time has passed, automatically turns off the power source for the digital camera 10, thereby further enhancing operability.

Moreover, in the present embodiment, the control circuit 51 automatically turns on the power source for the digital camera cradle 20 when it detects the energized state between the composite terminal connector 28 and the composite terminal 14 after the digital camera 10 is set in the retainer 22 in the digital camera cradle 20, and, after a predetermined period of time has passed, automatically turns off the power source for the digital camera cradle 20, thereby further enhancing operability.

Additionally, in the present embodiment, the control circuit 51 lights the display 30, for example, yellow during communications via the USB terminal and red during charging by the charging terminal. As a consequence, it is possible to readily confirm whether or not communications are being carried out via the USB terminal. Thus, it is possible to prevent erroneous detachment of the digital camera 10 from the retainer 22 in the digital camera cradle 20 during the communications via the USB terminal, and further, to readily confirm whether or not the digital camera 10 is being electrically charged. Moreover, since the communications indicating means and charging indicating means are integrated into the single display 30, the configuration is simple, thereby reducing cost.

Figure 6:
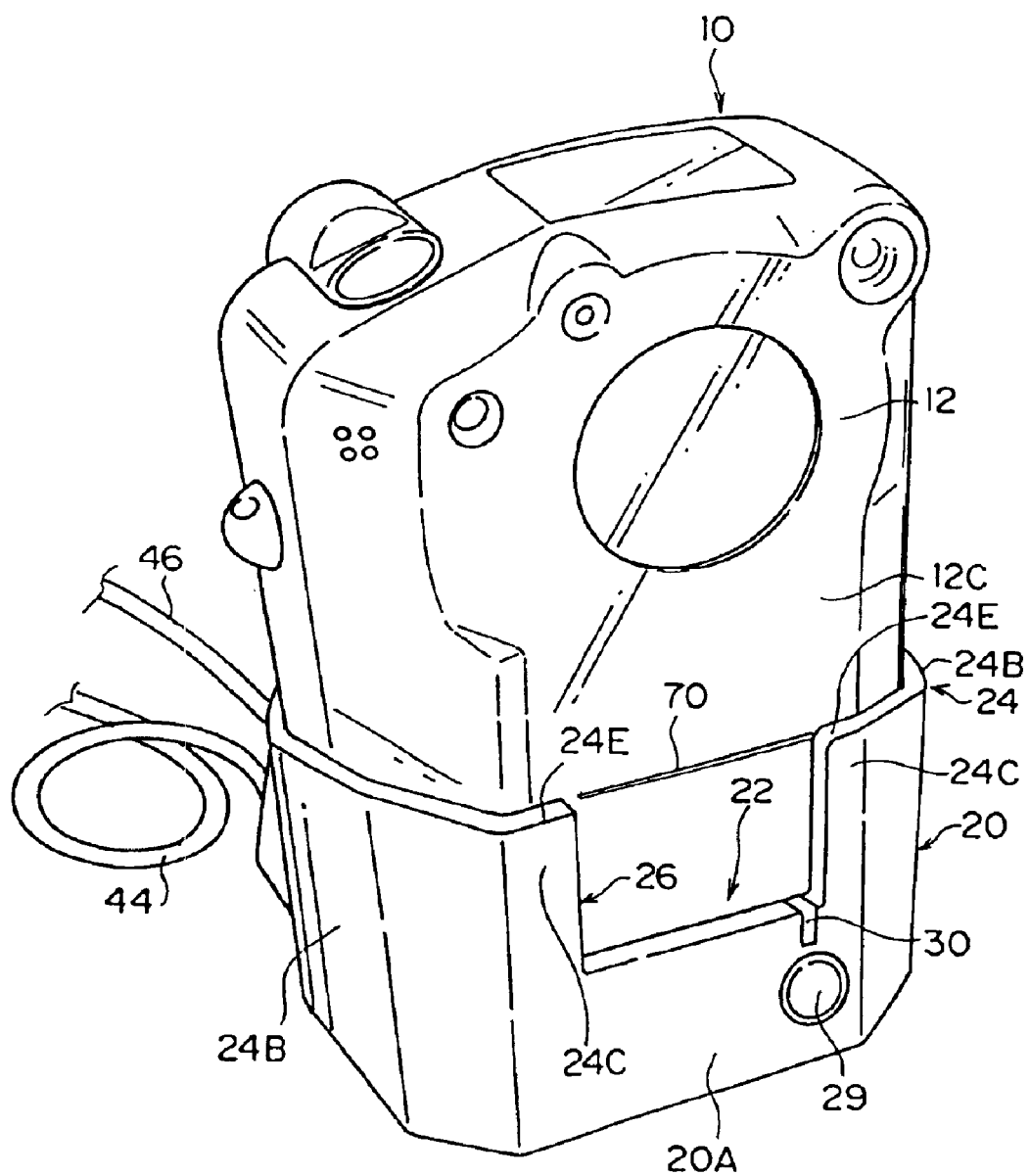
FIG. 6 is a perspective view illustrating the state in which a digital camera is set in a digital camera cradle according to a modification of the first embodiment of the present invention.

Also, the upper end 13A of the USB terminal 13 serving as the set-state comfirmation means and the upper surface 24D of the side portion 24B are aligned with each other when the digital camera 10 is set in the retainer 22 in the digital camera cradle 20 of the present embodiment, as shown in FIG. 1. However, for example, as shown in FIG. 6, a design line 70 formed at a lower portion of the front surface 12C of the casing 12 of the digital camera 10 may be used as the set-state comfirmation means instead, and the design line 70 may be aligned with a straight line connecting upper surfaces 24E of the right and left front portions 24C of the wall 24.

Also, in the present embodiment, the side portions 24B of the wall 24 formed at the retainer 22 in the digital camera cradle 20 are configured to shield the charging terminal 11 and the USB terminal 13 formed at the lower portion of the side surface 12B of the casing 12 in the digital camera 10 when the digital camera 10 having the charging terminal 11 and the USB terminal 13 is set in the digital camera cradle 20 of the present embodiment. However, the side portions 24B of the wall 24 formed at the retainer 22 in the digital camera cradle 20 may instead be configured to shield one of the charging terminal 11 and the USB terminal 13 in the digital camera 10, when the digital camera 10 that is set in the digital camera cradle 20 has either the charging terminal 11 or the USB terminal 13 formed at the lower portion of the side surface 12B of the casing 12.

Alternatively, although a USB terminal, which is a wire terminal serving as a personal computer connecting terminal, is provided in the digital camera 10 of the present embodiment, the personal computer connecting terminal is not limited to wire terminals such as USB terminals, and may be, for example, a wireless terminal that uses BLUETOOTH technology or infrared radiation.

Figure 9:
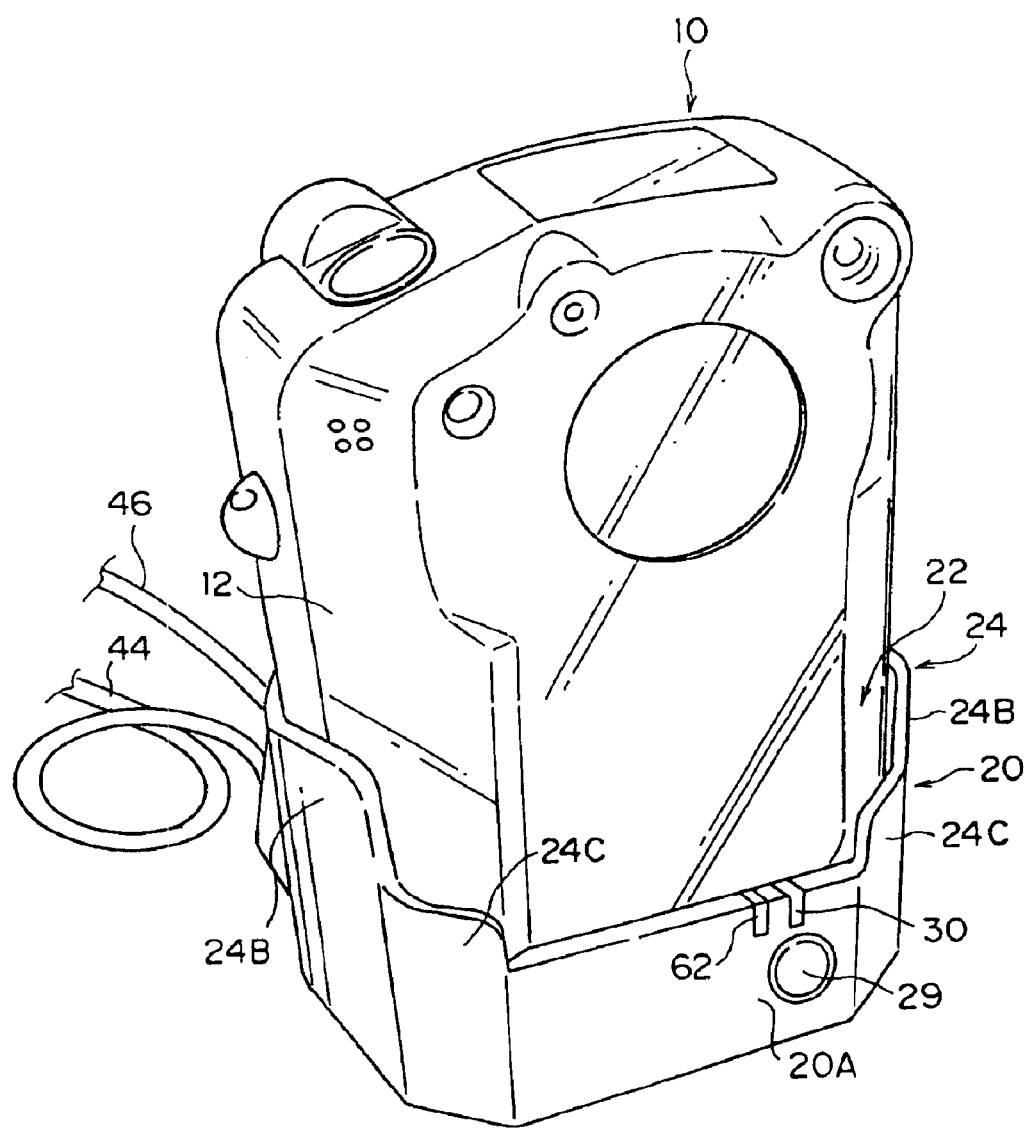
FIG. 9 is a perspective view illustrating a state in which a digital camera is set in a digital camera cradle according to another modification, different from that of FIG. 6, of the first embodiment of the present invention.

Also, the communications indicating means and the charging indicating means are integrated into the single display 30 and lighting colors are changed in the present embodiment. However, communications and charging may instead be discriminated by variations of lighting or flashing in the same color. Alternatively, the display 30 to serve as the communications indicating means and another display 62 to serve as the charging indicating means may be disposed independently of each other in the digital camera cradle 20, as shown in FIG. 9.

Also, in the present embodiment, the charging terminal connector and the USB terminal connector are integrated into the composite terminal connector 28 of the digital camera cradle 20. However, if the charging terminal and the USB terminal, which are formed at the digital camera 10 side and are used for connection to the digital camera cradle 20, are instead provided separately from each other, the charging terminal connector and the USB terminal connector may also be provided separately from each other in the digital camera cradle 20.

Subsequently, description will be given of a second preferred embodiment of a cradle for a digital camera according to the present invention, with reference to FIG. 7.

Here, constituent members the same as those in the first embodiment are designated by the same reference numerals, and descriptions thereof will accordingly be omitted hereinafter.

Figure 7:
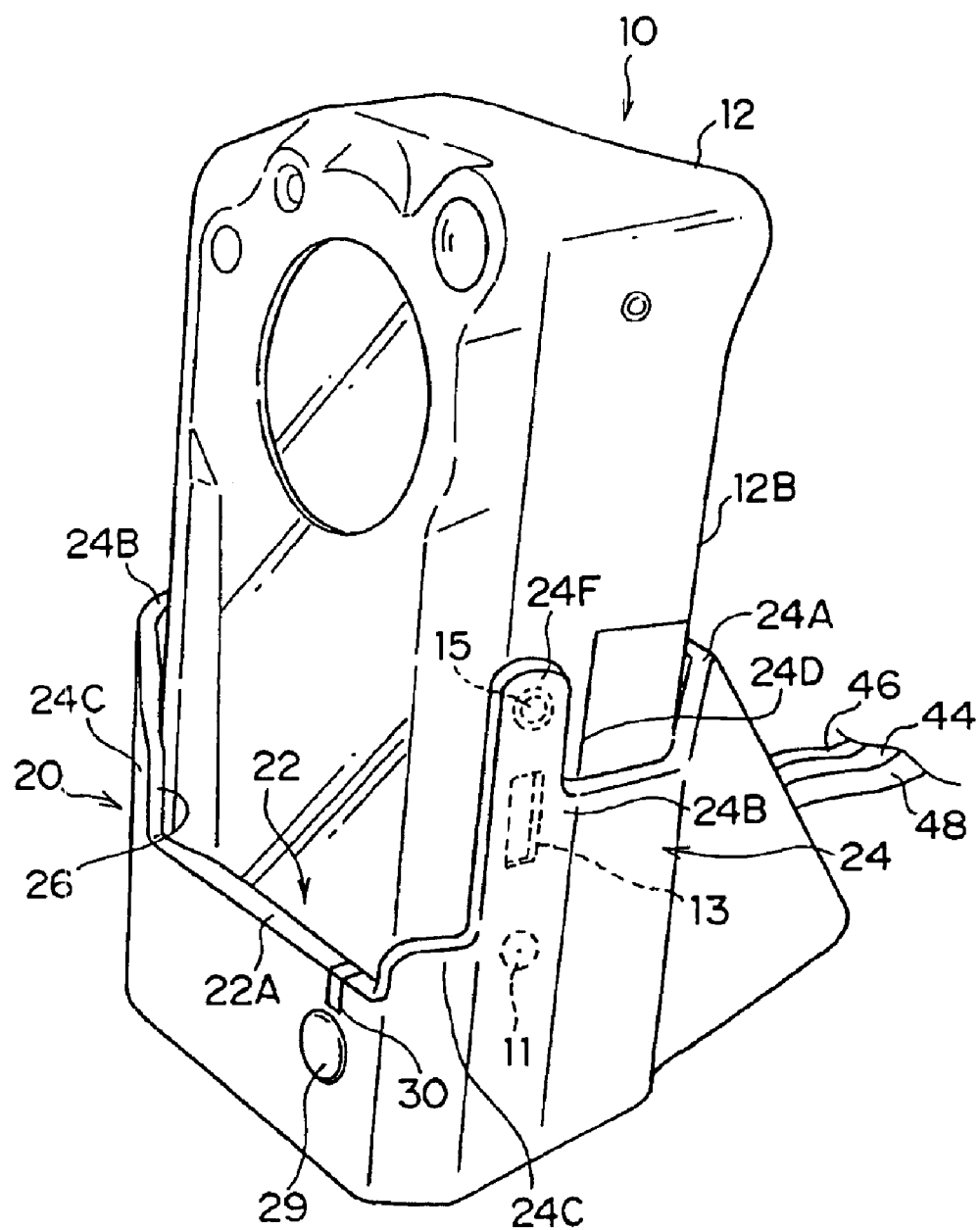
FIG. 7 is a perspective view illustrating a state in which a digital camera is set in a digital camera cradle according to a second embodiment of the present invention.
Figure 8:
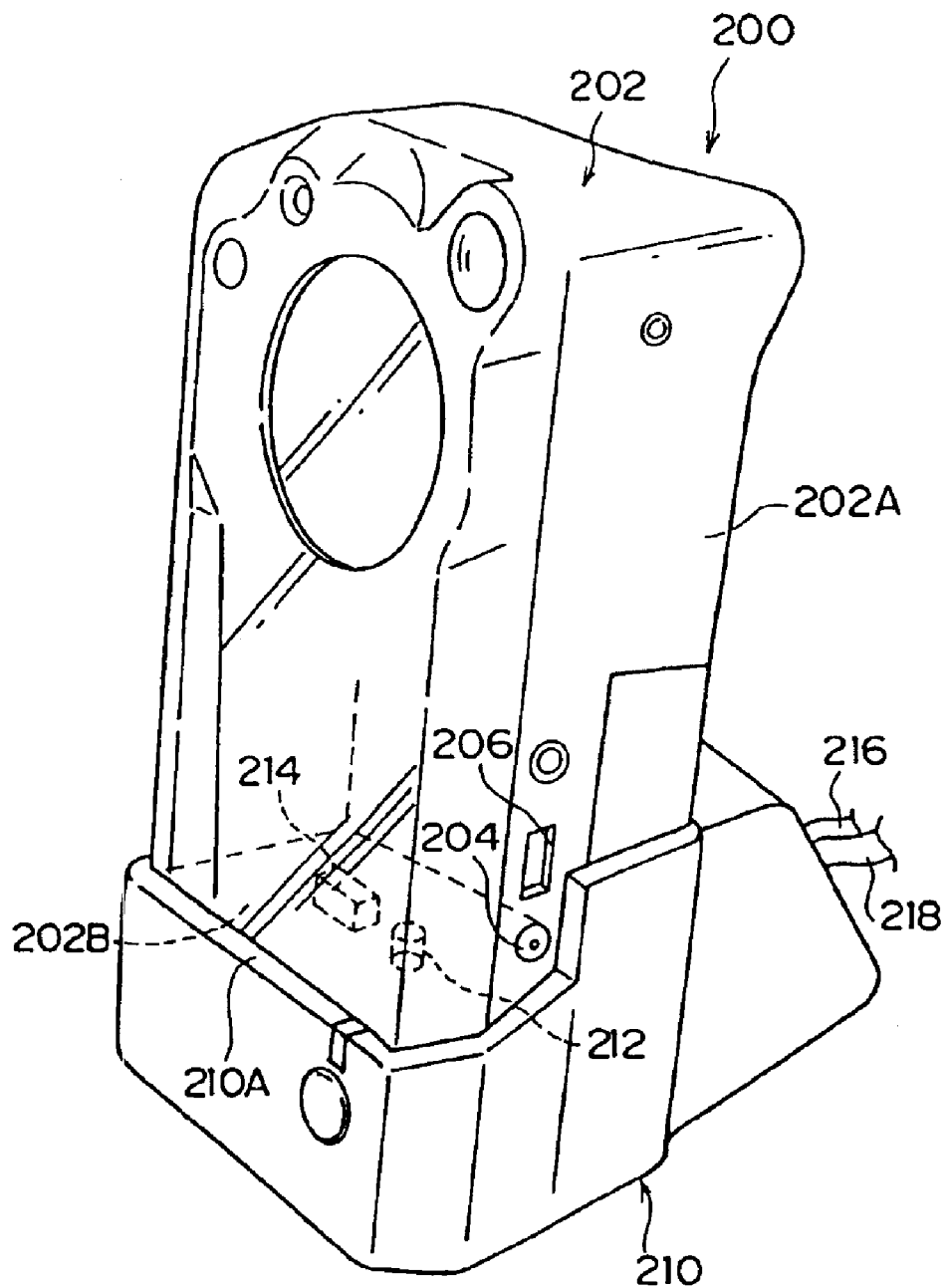
FIG. 8 is a perspective view illustrating the state in which a digital camera is set in a digital camera cradle of the prior art.

As shown in FIG. 7, an AV terminal shield 24F extends upward from the side portion 24B of the wall 24 of the digital camera cradle 20 of the present embodiment. In a state in which the digital camera 10 is set in the digital camera cradle 20, the AV terminal shield 24F shields an AV terminal 15 in the digital camera 10.

Although not shown, an AV terminal is formed substantially at the same location as the charging terminal 40 and USB terminal 42 (see FIG. 3) in the digital camera cradle 20. An AV cord 48 is connected to the AV terminal.

Next, explanation will be given of operation of the present embodiment.

Functions and effects similar to those of the first embodiment can be produced in the present embodiment. Furthermore, the AV terminal shield 24F can shield the AV terminal 15 of the digital camera 10 when the digital camera 10 is set in the digital camera cradle 20. As a consequence, the AV cord 48 cannot be connected directly to the AV terminal 15 in the digital camera 10. Therefore, it is possible to prevent redundant connection of the AV cord 48 when the digital camera 10 is set in the digital camera cradle 20.

Although the present invention has been described in detail with respect to the particular embodiments, it is not limited to the above-described embodiments. It will now be apparent to those skilled in the art that other variations and modifications may be made without departing from the scope of the invention.

What is claimed is:

1. A cradle for a digital camera provided with connecting terminals of a first plurality of kinds, the cradle comprising:
    a retainer for retaining therein a digital camera;
    a shield formed at the retainer; and
    a composite terminal including integratedly formed connecting terminals of a second plurality of kinds,
    wherein, when the digital camera is set in the cradle, the shield shields, of the connecting terminals of the first plurality of kinds, connecting terminals that are of the same kinds as the connecting terminals of the second plurality of kinds, and
    the shield comprises an upper end portion and, when the digital camera is completely set in the retainer, the upper end portion of the shield substantially aligns with an upper end portion of the uppermost-positioned connecting terminal of the connecting terminals that are shielded by the shield.

2. A cradle for a digital camera as claimed in claim 1, wherein the connecting terminals that are shielded by the shield include a charging terminal and an external device connecting terminal.

3. A cradle for a digital camera as claimed in claim 2, wherein the external device connecting terminal comprises a personal computer connecting terminal.

4. A cradle for a digital camera as claimed in claim 2, wherein the upper end portion of the shield substantially aligns with an upper end portion of the uppermost-positioned one of the charging terminal and the external device connecting terminal.

5. A cradle for a digital camera as claimed in claim 3, wherein the upper end portion of the shield substantially aligns with an upper end portion of the uppermost-positioned one of the charging terminal and the personal computer connecting terminal.

6. A cradle for a digital camera as claimed in claim 3, wherein the digital camera further includes an AV terminal, and the shield does not shield the AV terminal when the digital camera is set in the retainer.

7. A cradle for a digital camera as claimed in claim 2, wherein the digital camera includes a digital camera side composite terminal having integrally formed therein connecting terminals of kinds corresponding to kinds of the connecting terminals that are shielded by the shield, and the digital camera side composite terminal electrically connects to the composite terminal formed at the cradle when the digital camera is set in the retainer.

8. A cradle for a digital camera an claimed in claim 3, wherein the digital camera includes a digital camera aide composite terminal having integrally formed therein connecting terminals of kinds corresponding to kinds of the connecting terminals that are shielded by the shield, and the digital camera side composite terminal electrically connects to the composite terminal formed at the cradle when the digital camera is set in the retainer.

9. A cradle for a digital camera provided with connecting terminals of a first plurality of kinds, the cradle comprising:
    a retainer for retaining therein a digital camera;
    a shield formed at the retainer; and
    a composite terminal including integratedly formed connecting terminals of a second plurality of kinds,
    wherein, when the digital camera is set in the cradle, the shield shields, of the connecting terminals of the first plurality of kinds, connecting terminals that are of the same kinds as the connecting terminals of the second plurality of kinds, and
    the digital camera comprises a digital camera side composite terminal having integrally formed therein connecting terminals of kinds corresponding to kinds of the connecting terminals that are shielded by the shield, and the digital camera side composite terminal electrically connects to the composite terminal formed at the cradle when the digital camera is set in the retainer.

10. A cradle for a digital camera as claimed in claim 9, wherein the connecting terminals that are shielded by the shield include a charging terminal and an external device connecting terminal.

11. A cradle for a digital camera as claimed in claim 10, wherein the external device connecting terminal comprises a personal computer connecting terminal.

12. A cradle for a digital camera as claimed in claim 9, wherein the digital camera further includes an AV terminal, and the shield does not shield the AV terminal when the digital camera is set in the retainer.

13. A cradle for a digital camera that comprises a first plurality of connecting terminals comprising different types of connecting terminals, the cradle comprising:
    a retainer for retaining therein the digital camera;
    a shield disposed at the retainer; and
    a composite terminal comprising a second plurality of connecting terminals that comprises different types of connecting terminals, wherein the different types of connecting terminals are integrated together,
    wherein, when the digital camera is set in the cradle, connecting terminals in the first and second plurality of connecting terminals that are of the same type are shielded by the shield, and
    the shield comprises an upper end portion and, when the digital camera, is completely set in the retainer, the upper end portion of the shield substantially aligns with an upper end portion of the uppermost-positioned connecting terminal of the first plurality of connecting terminals that are shielded by the shield.

14. A cradle for a digital camera as claimed in claim 13, wherein the connecting terminals that are shielded by the shield include a charging terminal and an external device connecting terminal.

15. A cradle for a digital camera as claimed in claim 13, wherein the digital camera further comprises an AV terminal, and the shield does not shield the AV terminal when the digital camera is set in the retainer.

16. A cradle for a digital camera that comprises a first plurality of connecting terminals comprising different types of connecting terminals, the cradle comprising:

a retainer for retaining therein the digital camera;

a shield disposed at the retainer; and a composite terminal comprising a second plurality of connecting terminals that comprises different types of connecting terminals, wherein the different types of connecting terminals are integrated together, wherein, when the digital camera is set in the cradle, connecting terminals in the first and second plurality of connecting terminals that are of the same type are shielded by the shield, and the digital camera comprises a digital camera side composite terminal having integrally disposed therein connecting terminals corresponding to the type of connecting terminals shielded by the shield, and the digital camera side composite terminal electrically connects to the composite terminal formed at the cradle when the digital camera is set in the retainer.

17. A cradle for a digital camera as claimed in claim 16, wherein the connecting terminals that are shielded by the shield include a charging terminal and an external device connecting terminal.

18. A cradle for a digital camera as claimed in claim 16 wherein the digital camera further comprises an AV terminal, and the shield does not shield the AV terminal when the digital camera is set in the retainer.

* * * * *